W. F. MOORHOUSE.
CUTTING TORCH.
APPLICATION FILED SEPT. 17, 1917.
1,280,068.
Patented Sept. 24, 1918.
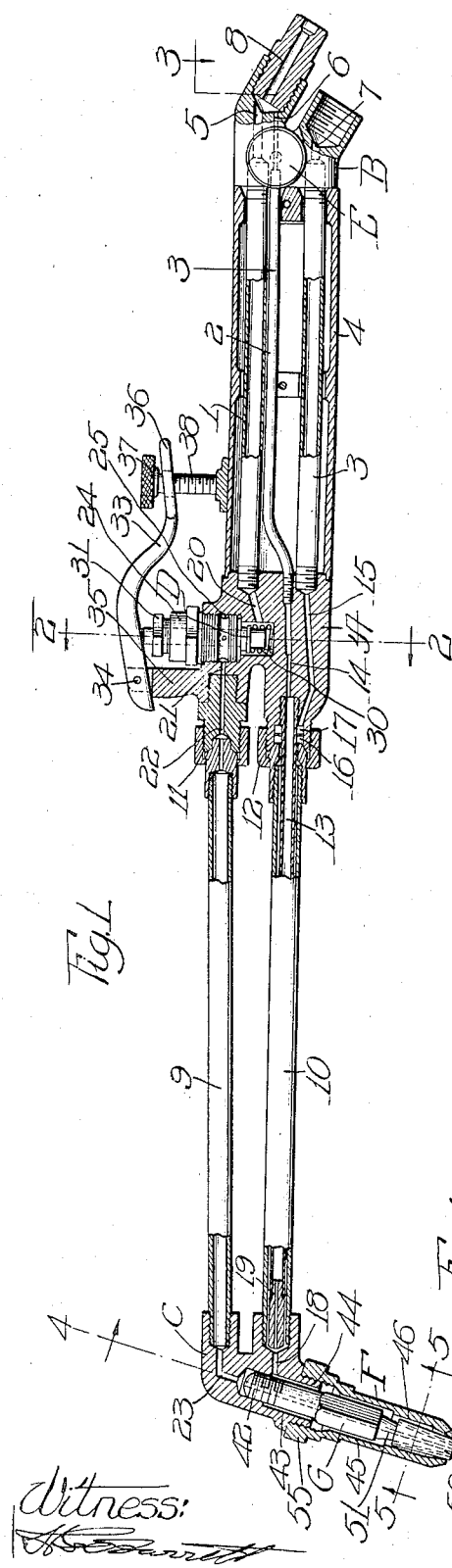
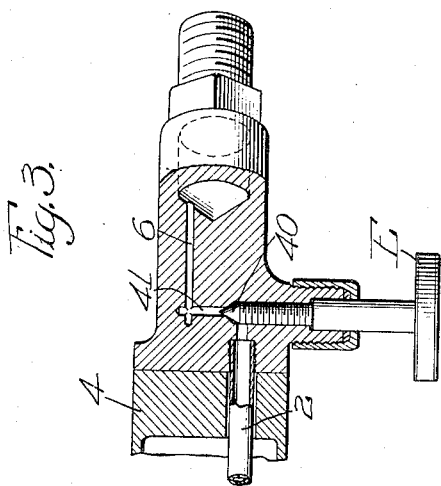
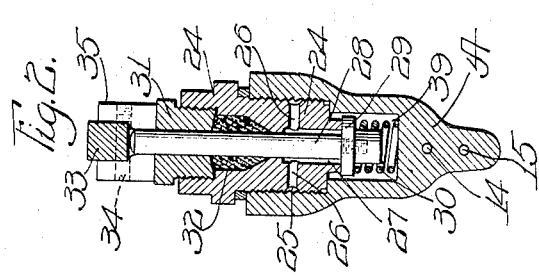
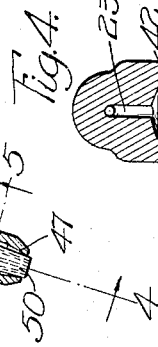
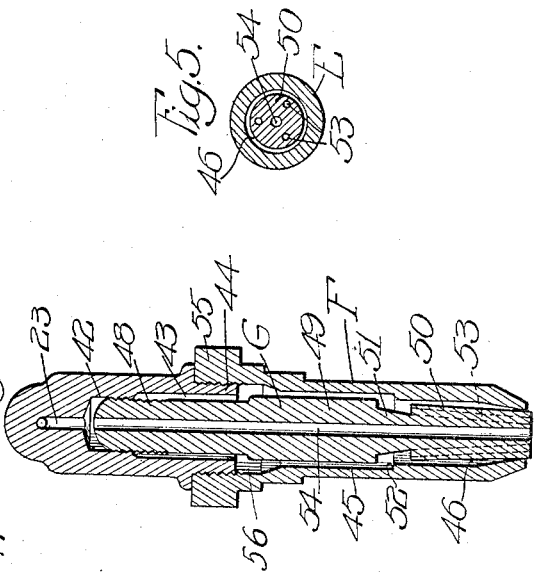
Witness:
Inventor:
William F. Moorhouse
by: Arthur F. Durand
Atty.

UNITED STATES PATENT OFFICE.

WILLIAM F. MOORHOUSE, OF CHICAGO, ILLINOIS, ASSIGNOR TO FIDELITY BRASS MANUFACTURING COMPANY, OF CHICAGO, ILLINOIS, A CORPORATION OF ILLINOIS.

CUTTING-TORCH.

1,280,068.  Specification of Letters Patent.  Patented Sept. 24, 1918.

Application filed September 17, 1917. Serial No. 191,868.

*To all whom it may concern:*

Be it known that I, WILLIAM F. MOORHOUSE, a citizen of the United States of America, and resident of Chicago, county of Cook, and State of Illinois, have invented a certain new and useful Improvement in Cutting-Torches, of which the following is a specification.

My invention relates to cutting torches of that kind in which the head or nozzle is provided with one passage leading thereto for the oxygen, and with another passage leading thereto for the acetylene gas, there being also an auxiliary passage for oxygen, associated with the passage for the acetylene gas, in the usual and well-known manner.

The object of my invention is to provide certain novel details and features of improvement and combinations tending to increase the general efficiency and desirability of a cutting torch of this particular character, so that the parts may be easily assembled and taken apart, and whereby the oxygen and acetylene gas may be controlled at will and combined to produce a flame of high temperature, as will hereinafter more fully appear.

To these and other useful ends my invention consists in matters hereinafter set forth and claimed.

In the accompanying drawings—

Figure 1 is a longitudinal section, with certain portions thereof in side elevation, of a cutting torch embodying the principles of my invention.

Fig. 2 is an enlarged section on line 2—2 in Fig. 1.

Fig. 3 is an enlarged section on line 3—3 in Fig. 1.

Fig. 4 is an enlarged section on line 4—4 in Fig. 1.

Fig. 5 is an enlarged section on line 5—5 in Fig. 1.

As thus illustrated, my invention comprises a casting or body fitting A connected to the casting or other body fitting B by the tubes 1, 2 and 3, and by means of a shell or casing 4, whereby a handle is provided for the torch. The casting or fitting B has a passage 5 which leads to the tube 1, a passage 6 which leads to the tube 3, and a passage 7 which leads to the tube 3, the passages 5 and 6 being connected by a suitable coupling 8 with the source of oxygen pressure. The passage 7 is connected in a suitable manner with the supply of acetylene gas. The casting or head C is connected by tubes 9 and 10 with the body fitting A, by means of suitable couplings 11 and 12, and the tube 10 contains a smaller tube 13, the latter fitting loosely therein and being tightly screwed in the fitting A to communicate with the passage 14 which leads to the tube 2 previously described. A passage 15 leads from the tube 3 to the chamber 16 in the coupling 12, and this chamber contains a screen or wire mesh filter 17 of any suitable character, whereby the acetylene gas, after passing through the passage 15, will then pass through the filter or screen 17 and through the coupling 12 into the tube 10, and will then flow through the latter around the outer surface of the tube 13 until it reaches the passage 18 in the head C in a manner that will be readily understood. On the other hand, the oxygen passing from the tube 2 through the passage 14 will pass into the tube 13 and flow therein until it reaches the nozzle 19 at the other end of the tube, which nozzle is in alinement with the passage 18, so that the oxygen and acetylene gas will come together and be mixed primarily in this passage 18 before escaping from the outer nozzle. The high pressure oxygen in the tube 1 will pass through the passage 20 in the fitting A, then through the valve device D to the passage 21, and through the passage 22 of the coupling 11 to the tube 9, and from the latter to the passage 23 in the head. Said valve device preferably comprises a bushing 24 screwed into the fitting A and provided with an annular groove 25 connected by short transverse passages 26 with the central bore 27, which latter is somewhat larger in diameter than the vertically disposed reciprocating valve stem 28, the latter having a movable valve member 29 on the lower end thereof to engage the lower end of said bushing. A spring 30 engages said valve member to keep it normally seated. The bushing 24 has a gland 31 screwed into the upper end thereof, and a packing chamber 32 is provided beneath this gland, in the upper end portion of the bushing, whereby a stuffing box is provided for the valve stem 28 which extends upwardly to engage the pivoted lever 33 by which the valve is opened and closed. This lever is preferably pivoted at 34 on the upstanding portion 35 of the casting or fitting A, and has its free end portion 36 adapted to engage the thumb screw nut 37, which latter is screwed upon and thereby adjustable up and down on the vertically arranged screw 38, which has its lower end suitably secured to the casing 4 of the handle or body of the torch. The middle portion of this lever 33 bears upon the upper end of the valve stem 28, so that downward movement of the end portion 36 of the lever will open the valve, thereby permitting the oxygen to pass from the short passage 20 into the chamber 39 in the fitting A, then upward through the bore 27 of the bushing, to the passages 26 to the annular groove 25 and from the latter to the short passage 21 previously described. Thus the entire stuffing box and valve are removable as a unit, by unscrewing the bushing 24, in a manner that will be readily understood. A thumb screw E is inserted in the casting or fitting B and provided with a pointed inner end portion 40 that engages one end of the passage 41 that extends at right angles to the passage 6, and which connects the latter with the tube 2 previously described, whereby the supply of oxygen to the pipe 2 is controllable at will by the thumb screw E, which serves as a needle valve.

The head C has a screw-threaded socket 42 extending downward from the passage 23, and the lower portion of this socket is enlarged to form the bore 43, so that a chamber is formed to receive the acetylene gas and oxygen from the passage 18 previously described. The nozzle F has one end thereof internally screw-threaded to engage the threaded boss 44 of the head, and this nozzle is formed with an upper bore or internal diameter 45, and with a slightly smaller bore or internal diameter 46 in the lower end portion thereof, the bore 46 being slightly tapered at 47, in a manner that will be readily understood. The inner nozzle G is provided with a reduced threaded portion 48, which screws into the threaded socket 42, with a hexagonal middle portion 49 which occupies the bore 45 of the outer nozzle, and with a lower end portion 50 which occupies the bore 46 in the outer nozzle. This portion 50 is slightly tapered and tightly fits the outer end of the tapered portion 47 of the bore in the lower end of the outer nozzle, so that no leakage can occur at this point between the inner and outer nozzles. A tapered portion 51 connects the portion 49 with the portion 50, so that this tapered portion 51, which is of less diameter than the other portions of the inner nozzle is opposite the jog or shoulder 52 on the inner surface of the outer nozzle. Longitudinally disposed and converging passages 53 are formed in the tapered portion 50 of the inner nozzle, the upper ends of these passages communicating with the space formed around the tapered portion 51 and the lower ends of these passages being located on the end of the inner nozzle. Said inner nozzle G is provided with a central longitudinal bore 54, which leads from the passage 23, and which provides the final opening for the escape of the high pressure oxygen. It will be seen that the longitudinal edges of the polygonal portion 49 of the inner nozzle engage the sides of the straight bore 45, so that parallel passages are provided leading to the cavity or space formed by the reduced tapered portion 51 of the inner nozzle. The bore 46 loosely surrounds the greater portion of the tapered portion 50, but the latter is engaged near its outer end by the extreme end of the tapered portion 47, so that downward adjustment of the inner nozzle G will force the tapered portion 50 downward until it very tightly fits the lower end of the tapered bore portion 47 of the outer nozzle. The shoulder 52 will limit this downward adjustment of the inner nozzle, in the outer nozzle, of course, but serves also to deflect the mixture of the gas and air from the parallel passages formed by the portion 49 inward and toward the upper ends of the converging passages 53, which latter concentrate the discharge therefrom in the discharge from the straight bore of the inner nozzle. As will be seen, the reduced portion 51 is tapered at about the same angle as the angle of convergence of the passages 53, so that the upper ends of the latter are located around the lower end of said reduced tapered portion of the inner nozzle.

In the assembling of the different parts, the tubes and castings are all easily coupled together, and the inner nozzle G is first screwed into the socket 42, and the outer nozzle is then screwed onto the box 44, so that the internally tapered portion of the outer nozzle is drawn tightly upon the externally tapered end portion of the inner nozzle, the hexagonal portion 49 permitting the application of a wrench thereto for the purpose of tightly screwing the inner nozzle into the head. The outer nozzle has the hexagonal portion 55 by which it is screwed onto the boss 44, in a manner that will be readily understood.

In use, the needle valve 40 is operated by turning the thumb screw E to regulate the so-called preheating oxygen which passes into the tube 2, and which passes from the latter into the tube 13, then escapes into the passage 18 and then into the mixing chamber provided by the bore 43 where it mingles with the acetylene gas that passes from the tube 3 into the tube 10, in the manner previously explained. The thumb screw E having been adjusted to properly regulate the oxygen, the mixture then passes from the bore 43 into the bore 45, and from the latter into the annular space extending around the tapered portion 51, and then finally escapes through the passages 53 of the inner nozzle. The high pressure oxygen passes from the tube 1 through the valve device D and into the tube 9, and then through the bore 54 of the inner nozzle, so that the high pressure oxygen mingles with the mixture of acetylene gas and preheating oxygen as they escape from the end of the nozzle.

In use it will be understood that the supply of acetylene gas is regulated or controlled in any suitable manner, as by the valve or regulator on the tank containing the gas, or in any other suitable manner. In starting the work, the gas is turned on and ignited, and a supply of oxygen to the flame is provided by the pipes 3 and 13, as previously stated, so that there is a mixture of the gas and oxygen in the passage 18, and also just before the gas and oxygen enter this short passage from the ends of the tubes 10 and 13, so that a proper flame will be produced. As soon as the metal is sufficiently heated (this is why the oxygen supplied through the pipes 2 and 13 is called the preheating oxygen) the valve D is then opened to permit the escape of the high pressure oxygen by which the metal is oxidized and which produces the cutting action characteristic of a torch of this kind. The thumb nut 37 can be set to keep the valve D open the required degree, so that the cutting action will be steady and uninterrupted, leaving both hands of the operator free for other purposes. But the nut 37 can be removed when it is desirable to leave the lever 33 free for unrestricted control by the thumb of the hand in which the operator is holding the handle of the torch.

The interior of the outer nozzle F is enlarged at its upper end, just below the boss 44, to form a distributing chamber 56 by which the gas is fed and distributed equally to the parallel passages formed by the hexagonal portion 49, and to which chamber 56 the gas is fed from the bore 43, and with this construction, which involves the deflecting shoulder 52, the tendency of the flame to flash back into the nozzle and other passages is greatly reduced.

What I claim as my invention is:

1. In a cutting torch, a head having a plurality of inlet passages, an inner nozzle screwed into said head, an outer nozzle screw-connected with said head and formed with an upper bore and a lower bore to inclose the inner nozzle, and supply means connected with said inlet passages, said inner nozzle having a central bore communicating with one of said passages, said head providing a mixing chamber extending around the inner nozzle and communicating with one of said passages, with a distributing chamber in the upper end of said outer nozzle to receive the gas from said mixing chamber, said inner nozzle having an intermediate polygonal portion fitting said upper bore, and a tapered end portion inclosed by the lower bore and provided with converging outlet passages, with a reduced portion between the polygonal portion and the tapered portion, said polygonal portion providing a plurality of parallel passages leading from said distributing chamber to said cavity, and the end portion of said outer nozzle being formed below said lower bore to receive the tapered end portion of the inner nozzle to form a tight joint between the ends of the two nozzles, so that the discharge from said converging passages is concentrated in the discharge from said inner nozzle.

2. In a cutting torch, a body member provided with an inlet passage and an outlet passage and a chamber connecting one passage with the other, with one passage out of line with the other, a bushing screwed into said chamber, a valve carried by said bushing and provided with a reciprocating stem extending axially through said bushing, a valve seat on the lower end of said bushing to engage said valve, a gland screwed into the outer end of said bushing, forming a stuffing box for said valve stem, and means to open and close said valve, said bushing being formed with a passage which forms a guide for said stem and which is controlled by said valve, and the lower portion of said chamber being formed to contain said valve and to connect said inlet passage with said passage in the bushing, so that when said valve is open the oxygen will pass from said inlet passage through a portion of said chamber and through the bushing to the outlet passage.

3. In a cutting torch, a body member provided with passages for the oxygen and gas, a reciprocating valve to control the passage of oxygen through said member, a pivoted handle forming a lever to operate said valve, and adjustable means to hold said handle in different positions, so that said valve can be retained either partially or fully open, said valve and handle being operative with said means omitted.

4. In a cutting torch, a body provided with passages for the oxygen and gas, and having an auxiliary passage for oxygen, a tube to receive the gas, another tube to receive the auxiliary oxygen, one tube being telescoped inside of the other, a feed tube leading to said body, one of said passages leading from said feed tube to said inner tube, a head to which both of said telescoped tubes extend, a nozzle for said inner tube in said head, a discharge nozzle for said head, a valve device to regulate the supply of oxygen before it reaches said feed tube, a second feed tube leading to the main oxygen passage of said body, a third feed tube leading to the gas passage of said body, and a fitting to support said valve and having three separate passages leading to said feed tubes.

5. The combination, in a cutting torch, of (1) a head having inlets, (2) an inner nozzle screwed into the head and provided with a straight central bore to receive gas from one of said inlets, said nozzle having an upper portion of a diameter to form a chamber in said head to receive gas and air from another of said inlets, a tapered lower portion having converging outlets, a middle portion formed to provide parallel passages, with a reduced portion between said tapered portion and said middle portion; and (3) an outer nozzle screw connected to said head and formed with a bore inclosing said inner nozzle, said bore being formed to engage the sides of said middle portion and to provide space around and below said reduced portion and to tightly fit said tapered portion only at the end of said outer nozzle, so that said space extends around the tapered portion.

6. A structure as specified in claim 5, said middle portion having parallel longitudinal portions which engage said bore, and which separate said parallel passages from each other, and said bore being provided with a deflecting shoulder opposite said reduced portion.

7. A structure as specified in claim 5, said parallel passages providing a formation by which to grasp and turn the inner nozzle with a tool, and said reduced portion being tapered toward said converging passages, with a shoulder on said outer nozzle which limits the downward adjustment of said inner nozzle.

8. The combination, in a cutting torch, of a body having an inlet and an outlet for the gas, a bushing screwed into said body and formed with a central bore and having a circumferential groove communicating with said bore, said outlet leading away from said groove, a valve-seat on the inner end of said bushing, a reciprocating valve to engage said valve-seat, said inlet leading to said valve, a spring at said inlet to close said valve, a stem extending through said bore to operate said valve, so that when said valve is open the gas will pass from said inlet through said bore to said groove and outlet, a stuffing-box for said stem, and means to operate said stem.

9. In a cutting torch, an inner nozzle and an outer nozzle, the inner nozzle having a tapered outer end portion to tightly fit the end of the outer nozzle, a polygonal middle portion which is entirely within the outer nozzle, a reduced portion connecting the tapered portion with the polygonal portion, a reduced inner end portion which extends into the outer nozzle to join the polygonal portion and which is threaded to screw into the torch, a longitudinal bore extending from one end of said inner nozzle to the other end thereof, and a plurality of converging passages in said tapered portion.

10. A structure as specified in claim 9, said outer nozzle having a deflecting shoulder adjacent the inner ends of said converging passages.

11. A structure as specified in claim 9, said outer nozzle having a distributing chamber extending around the inner end of said polygonal portion, and forming, with said polygonal portion, a plurality of parallel passages leading from said distributing chamber, said torch having a head forming a mixing chamber which extends around the inner end portion of said inner nozzle and which leads to said distributing chamber.

Signed by me at Chicago, county of Cook, State of Illinois, this 30th day of August, 1917.

WILLIAM F. MOORHOUSE.